(12) United States Patent
Meyer et al.

(10) Patent No.: US 8,036,800 B2
(45) Date of Patent: Oct. 11, 2011

(54) METHOD FOR OPERATING A MOTOR VEHICLE CONTROL UNIT

(75) Inventors: Klaus-Gerd Meyer, Korntal-Muenchingen (DE); Johannes Wehle, Asperg (DE); Sven Gnutzmann, Vaihingen/Enz (DE); Roland Noller, Backnang (DE); Dieter Buchholz, Sachsenheim (DE); Holger Broede, Sachsenheim (DE)

(73) Assignee: Robert Bosch GmbH, Stuttgart (DE)

(*) Notice: Subject to any disclaimer, the term of this patent is extended or adjusted under 35 U.S.C. 154(b) by 90 days.

(21) Appl. No.: 12/226,941

(22) PCT Filed: Apr. 4, 2007

(86) PCT No.: PCT/EP2007/053287
§ 371 (c)(1),
(2), (4) Date: Apr. 16, 2009

(87) PCT Pub. No.: WO2007/128631
PCT Pub. Date: Nov. 15, 2007

(65) Prior Publication Data
US 2009/0319056 A1 Dec. 24, 2009

(30) Foreign Application Priority Data
May 8, 2006 (DE) .......................... 10 2006 021 300

(51) Int. Cl.
*G06F 7/00* (2006.01)
*G06F 17/00* (2006.01)
*G05B 19/18* (2006.01)
*G05B 11/01* (2006.01)

(52) U.S. Cl. ............... 701/51; 701/52; 701/67; 701/68; 700/7; 700/11; 700/13

(58) Field of Classification Search ............... 700/7–8, 700/11–14, 79; 712/232; 326/37, 46; 701/51–52, 701/113, 67–68
See application file for complete search history.

(56) References Cited

U.S. PATENT DOCUMENTS

| | | | | |
|---|---|---|---|---|
| 4,817,776 A | * | 4/1989 | Tateno et al. | 477/78 |
| 5,276,875 A | * | 1/1994 | Satoh | 399/76 |
| 5,469,553 A | | 11/1995 | Patrick | |
| 5,613,073 A | * | 3/1997 | Hammond et al. | 709/226 |
| 5,775,099 A | * | 7/1998 | Ito et al. | 60/274 |
| 5,790,898 A | * | 8/1998 | Kishima et al. | 700/1 |
| 5,819,202 A | * | 10/1998 | Sato et al. | 702/33 |
| 6,182,807 B1 | * | 2/2001 | Saito et al. | 191/2 |
| 6,481,304 B1 | * | 11/2002 | Yoshioka et al. | 74/335 |
| 6,508,528 B2 | * | 1/2003 | Fujii et al. | 347/9 |
| 6,892,362 B1 | | 5/2005 | Donaghy et al. | |
| 7,010,450 B2 | * | 3/2006 | Law et al. | 702/108 |
| 7,190,709 B2 | * | 3/2007 | Eckhardt et al. | 375/145 |
| 7,447,500 B2 | * | 11/2008 | Endo et al. | 455/423 |
| 7,619,755 B2 | * | 11/2009 | Morimoto et al. | 358/1.1 |
| 2002/0144015 A1 | | 10/2002 | Lortz | |
| 2004/0199364 A1 | * | 10/2004 | Law et al. | 702/189 |
| 2006/0044623 A1 | * | 3/2006 | Morimoto et al. | 358/448 |
| 2007/0214323 A1 | * | 9/2007 | Moll et al. | 711/135 |
| 2008/0065285 A1 | * | 3/2008 | Yakes et al. | 701/22 |

FOREIGN PATENT DOCUMENTS

DE 199 63 214 7/2001
DE 103 60 200 7/2005

* cited by examiner

Primary Examiner — Ramesh Patel
(74) Attorney, Agent, or Firm — Kenyon & Kenyon LLP

(57) ABSTRACT

A method for operating a control unit, such a control unit, and a computer program and computer program product for implementing the method are provided. In this context, the control unit is able to assume multiple states, a transition state being interposed during the transition from a first state to a second state.

9 Claims, 2 Drawing Sheets

METHOD FOR OPERATING A MOTOR VEHICLE CONTROL UNIT

BACKGROUND OF THE INVENTION

1. Field of the Invention

The present invention relates to a method for operating a control unit that is able to assume multiple states. Furthermore, the present invention relates to a corresponding control unit, as well as a computer program and a computer program product for implementing the described method.

2. Description of Related Art

In the event of a change to a system state, it is known to carry out an initialization of the new state to be activated in a finite time that is as short as possible rather than carry out an abrupt change of state. During this initialization, in addition to initialization components, functionality from the old state is processed in a fast time slot pattern and functionality from the new state is processed in a slow time slot pattern. In this implementation, allowance must be made to ensure that RAM cells in slow time slot patterns are provided for further processing in fast time slot patterns. In this context, the problem arises that initializations that have been carried out are undone again during the transition when jointly-used RAM cells are accessed from the old state before it is ultimately possible to completely switch to the new state.

Furthermore, an abrupt switch is known in which all functions must provide that the input variables necessary for a calculation are available on time. This is achieved by processing the input variables in the time slot patterns in which they are also consumed. This procedure causes a higher runtime load relative to an implementation of the method described above.

A method and a device for starting up a control unit for a motor vehicle are known from published German patent document DE 199 63 214. In it, the following steps are provided: Checking whether a process to be monitored was started before the reset of the control unit; continuation of the process to be monitored if the process to be monitored was started before the reset of the control unit; and starting of the process to be monitored if the process to be monitored was not started before the reset of the control unit.

Published German patent document DE 103 60 200 describes a method and a device for operating a control unit. The control unit contains control unit software and this control unit software or parts of it may assume multiple states, each state being represented by at least one value of at least one state variable. In this context, a transition from a first state into a second state corresponds to a change of the value of the state variable, and a distinction is made between a first internal value of the state variable and a second external value of the state variable, both values being the same after the transition to another state has been carried out, and the change of the external value proceeding in a delayed manner relative to the change of the internal value. Thus, an optimization with regard to runtime and resource consumption is achieved.

BRIEF SUMMARY OF THE INVENTION

The method according to the present invention for operating a control unit that may assume multiple states provides that in the event of a transition from one first state to or into a second state, a temporary transition state is interposed during the transition.

This temporary transition state normally includes a clearly defined basic functionality that ensures an external communication, for example. Furthermore, the basic functionality may include an initialization of the second state.

When a condition for switching occurs, the temporary transition state is preferably interposed until the second state is reached.

Furthermore, a method is provided for operating a system having a control unit in which a transition from a first state into a second state takes place, the control unit assuming a temporary transition state during the transition.

The control unit according to the present invention may assume multiple states and is designed such that a temporary transition state is interposed during a transition from a first state to a second state.

The computer program according to the present invention includes program code means to implement all steps of a method described above if the computer program is executed on a computer or a corresponding processing unit.

The computer program product according to the present invention includes precisely these program code means, which are stored on a computer-readable storage medium.

The method according to the present invention ensures that a particular functionality based on cyclical time slot patterns is maintained during the initialization for the new system state, and at the same time that a deterministic initialization of the second or new system state is guaranteed. Instead of the decentral initialization of each individual function, the possibility for a central initialization is provided with regard to a system state change in order to save Flash resources and to design the transition between system states in a more transparent manner. In this context, the abrupt switchover is replaced by a targeted, deterministic switchover.

It is to be understood that the aforementioned features and the features yet to be explained below may be used not only in the combination indicated in each instance, but also in other combinations or by themselves, without departing from the scope of the present invention.

DETAILED DESCRIPTION OF THE INVENTION

Figure 1:
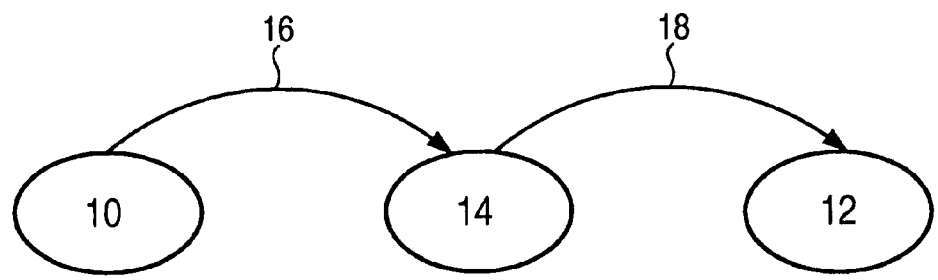
FIG. 1 shows a state diagram for the purpose of illustrating the method according to the present invention.

The present invention is represented schematically in the drawing in light of exemplary embodiments, and is described in detail below with reference to the drawing.

FIG. 1 shows a state diagram for the purpose of illustrating the method according to the present invention. A first state Z1 10 and a second state Z2 12 are shown. Furthermore, a temporary transition state TZ 14 is shown that contains actions necessary for entering the subsequent state or second state Z2 12.

Initially, the control unit is in state Z1 10. When a first condition [condition 1] is met, as is indicated by an arrow 16, the control unit initially assumes temporary transition state TZ 14, in which actions necessary for entering the subsequent state are carried out. When a second condition obtains [condition 2], as is illustrated by an additional arrow 18, a transition into second state Z2 12 occurs.

Thus, for the time period from the beginning of the switch when [condition 1] 16 occurs until activated state Z2 12 is reached, a temporary transition state TZ 14 is interposed in which a clearly defined basic functionality is represented. This clearly defined basic functionality includes actions necessary for entering into subsequent state Z2 12 and may be continuously expanded. This temporary transition state TZ 14 enables a deterministic transition from the first state Z1 10 to the second state Z2 12.

Figure 2:
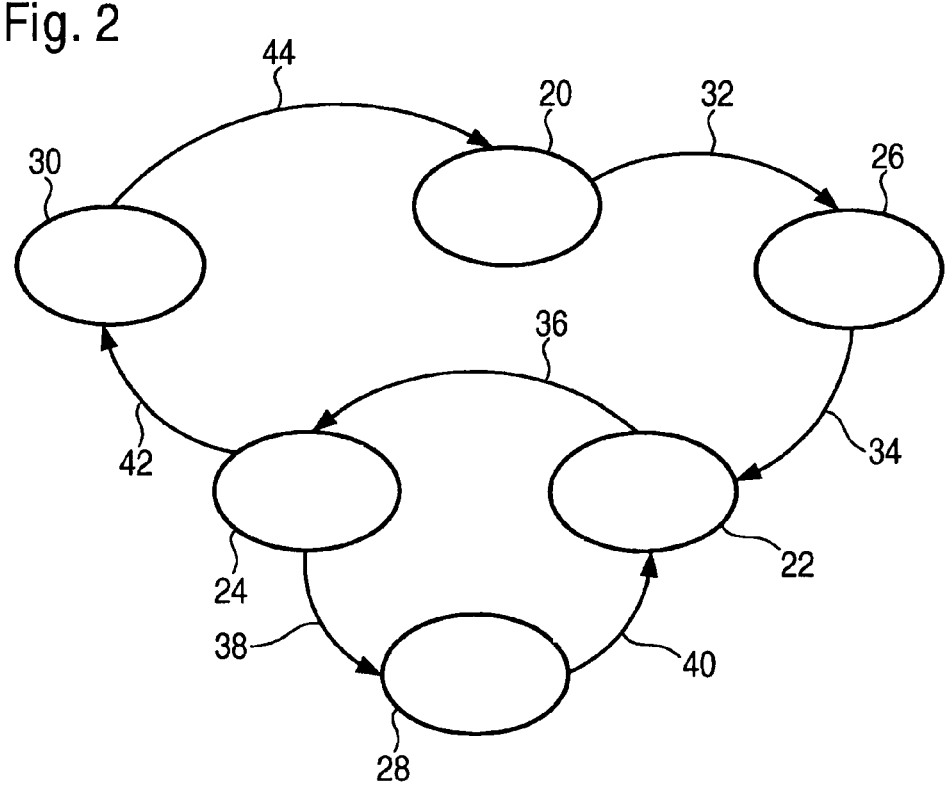
FIG. 2 shows an additional state diagram.

FIG. 2 shows an additional state diagram that shows an exemplary application of a control unit.

A state PreDrive 20, a state Drive 22, and a state Post-Drive 24 may be seen. Furthermore, a first temporary transition state 26, a second temporary transition state 28, and a third temporary transition state 30 may be seen.

In this approach, state PreDrive 20 represents the initial state as an example. When the condition [ignition key on] (arrow 32) is fulfilled, the first temporary transition state 26 is reached, which contains a parallel initialization of state Drive 22. As soon as the parallel initialization is terminated, and thus the condition [parallel initialization terminated] (arrow 34) fulfilled, the control unit transitions into state Drive 22. The control unit remains in this state until the condition [ignition key off] (arrow 36) is met and the control unit transitions into PostDrive state 24. The further behavior in this state 24 depends on the actions executed in this state 24. If the condition [ignition key on] (arrow 38) is met, initially the second temporary transition state 28 is assumed, which includes a parallel initialization of state Drive 22. As soon as the parallel initialization is terminated, that is, the condition [parallel initialization terminated] (arrow 40) is fulfilled, state Drive 22 is assumed.

If, starting from state PostDrive 24, the condition [PostDrive completed] (arrow 42) is met, the third temporary transition state 30 is assumed initially. This includes a parallel initialization of state PreDrive 20. As soon as the condition [parallel initialization terminated] (arrow 44) is fulfilled, initial state PreDrive 20 is assumed.

Thus, the states PreDrive 20, Drive 22, and PostDrive 24 are assumed in the control unit, for which system states are shown as examples in this representation. These system states feature particular hardware boundary conditions, for example, ignition key on/off, primary relay on/off. The requirement for this is that even when system states are being switched, the external communication, for example, a CAN communication, must not be disturbed. The transition into the next system state requires a deterministic initialization of the subsequent system state in a finite time period during which no functionality in the time slot pattern from the preceding system state—for the next system state—is permitted to write to initialized RAM cells and thus destroy the content of the RAM cells. By introducing a temporary transition state, the external communication may continue running without disturbance, and at the same time the initialization of the subsequent system state may be implemented.

This approach permits a stepwise expansion (migration) of the basic functionality, in which corresponding design requirements are taken into account within the functionality.

After the initialization of the subsequent state is completed as part of the switching of system states, it is possible to completely switch to the target state with the complete functionality.

As a possible implementation for the transition state, a new time table may be selected that must be newly created and correspondingly configured as part of the operating system.

The method according to the present invention helps to save resources (Flash) in the control unit and enables a transparent switch via function components that are designed in a targeted manner.

Figure 3:
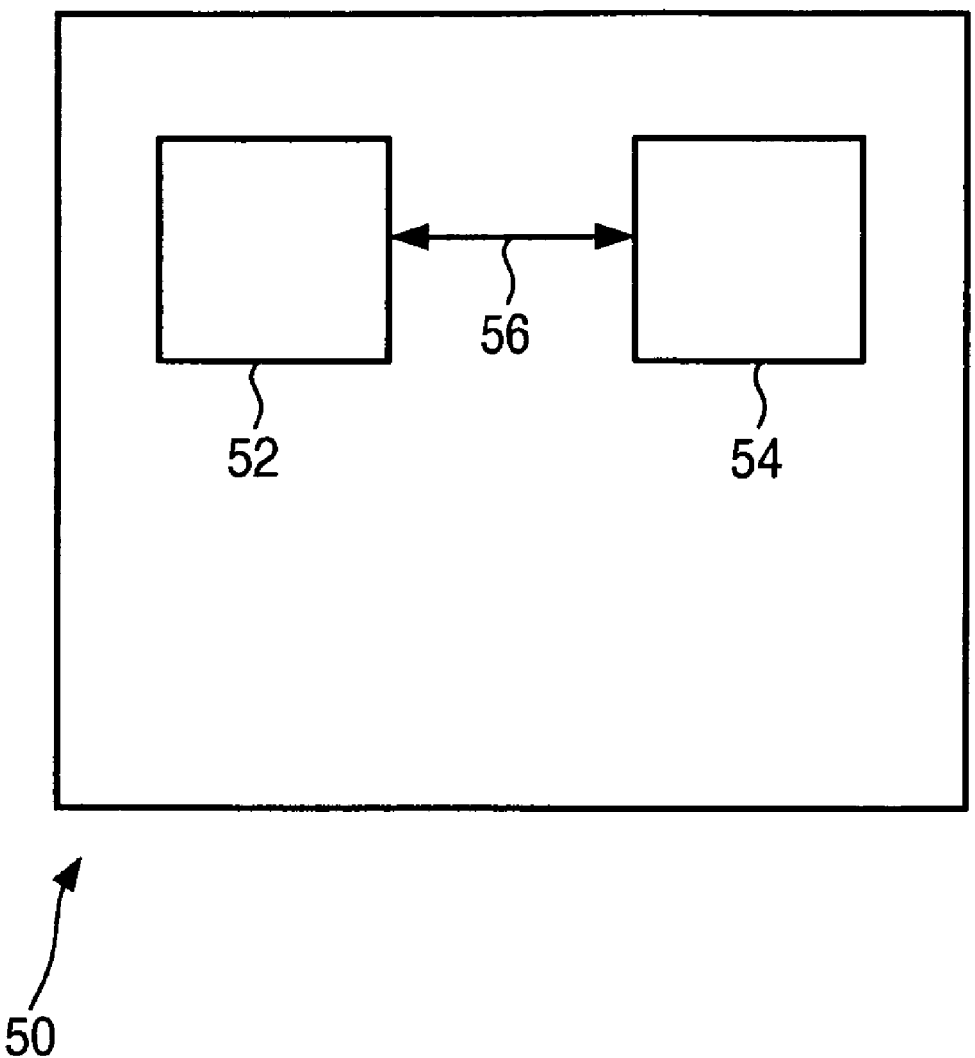
FIG. 3 shows an example embodiment of the control unit according to the present invention.

FIG. 3 shows an example embodiment of the control unit according to the present invention, denoted overall by reference numeral 50.

This control unit contains a processing unit 52 and a memory device 54 that are connected to each other via a communication line 56, for example, a bus system.

Memory device 54 stores a software, of which at least parts are able to assume multiple states.

What is claimed is:

1. A method for operating a motor vehicle control unit having a plurality of operating states, comprising:
providing a selective transition from a first operating state of the control unit into a second operating state of the control unit, wherein at least one of a plurality of temporary transition states is interposed between the first and second operating states during the selective transition, and wherein uninterrupted external communication is ensured in the at least one temporary transition state, and an initialization of the second state is performed in the at least one temporary transition state.

2. The method as recited in claim 1, wherein the control unit includes control unit software, and wherein at least a portion of the control unit software is configured to assume the at least one of the plurality of temporary transition states.

3. The method as recited in claim 1, wherein, when a condition for the transition occurs, the at least one of the temporary transition states is interposed until the second state has been reached.

4. The method of claim 1, wherein the external communication is based on cyclical time slot patterns.

5. The method of claim 1, wherein no functionality from the first operating state is permitted to write to memory cells initialized for the second operating state.

6. A method for operating a system having a control unit in a motor vehicle, comprising:
providing a selective transition from a first operating state of the control unit into a second operating state of the control unit, wherein a temporary transition state of the control unit is interposed between the first and second operating states during the selective transition, and wherein uninterrupted external communication is ensured in the temporary transition state, and an initialization of the second state is performed in the temporary transition state.

7. A motor vehicle control unit having a plurality of operating states, comprising:
a processing unit configured to provide a selective transition from a first operating state of the control unit into a second operating state of the control unit, wherein at least one of a plurality of temporary transition states is interposed between the first and second operating states during the selective transition, and wherein uninterrupted external communication is ensured in the at least one temporary transition state, and an initialization of the second state is performed in the at least one temporary transition state.

8. The control unit as recited in claim 7, wherein the control unit includes control unit software, and wherein at least a portion of the control unit software is configured to assume the at least one of the plurality of temporary transition states.

9. A non-transitory computer-readable storage medium storing a computer program having a plurality of codes configured to control, when executed on a computer, a method for operating a motor vehicle control unit having a plurality of operating states, the method comprising:
providing a selective transition from a first operating state of the control unit into a second operating state of the control unit, wherein at least one of a plurality of temporary transition states is interposed between the first and second operating states during the selective transition, and wherein uninterrupted external communication is ensured in the at least one temporary transition state, and an initialization of the second state is performed in the at least one temporary transition state.

* * * * *